(12) United States Patent
Hu et al.

(10) Patent No.: US 10,891,981 B2
(45) Date of Patent: Jan. 12, 2021

(54) AIR-BEARING SURFACE DESIGNS WITH A CURVED TRAILING AIR FLOW DAM

(71) Applicant: Western Digital Technologies, Inc., San Jose, CA (US)

(72) Inventors: Yong Hu, San Ramon, CA (US);
Weidong Huang, Palo Alto, CA (US);
David E. Fowler, San Jose, CA (US);
Taichi Nakamura, Kanagawa (JP)

(73) Assignee: Western Digital Technologies, Inc., San Jose, CA (US)

( * ) Notice: Subject to any disclaimer, the term of this patent is extended or adjusted under 35 U.S.C. 154(b) by 0 days.

(21) Appl. No.: 16/946,031

(22) Filed: Jun. 3, 2020

(65) Prior Publication Data
US 2020/0312357 A1    Oct. 1, 2020

Related U.S. Application Data

(62) Division of application No. 16/369,710, filed on Mar. 29, 2019, now Pat. No. 10,714,135.

(51) Int. Cl.
*G11B 5/60* (2006.01)

(52) U.S. Cl.
CPC .................. *G11B 5/6082* (2013.01)

(58) Field of Classification Search
CPC .................................................. G11B 5/6082
USPC ........................................... 360/236.1–236.5
See application file for complete search history.

(56) References Cited

U.S. PATENT DOCUMENTS

| | | |
|---|---|---|
| 5,633,767 A | 5/1997 | Boutaghou et al. |
| 6,108,157 A | 8/2000 | Yoneda et al. |
| 6,134,071 A | 10/2000 | Andoh et al. |
| 6,226,154 B1 | 5/2001 | Albrecht |
| 6,236,527 B1 | 5/2001 | Uchiike et al. |
| 6,341,050 B1 | 1/2002 | Coon |
| 6,480,361 B1 | 11/2002 | Patterson |
| 6,493,184 B1 | 12/2002 | Smith |
| 7,009,801 B2 | 3/2006 | Pit et al. |
| 7,019,945 B1 | 3/2006 | Peng et al. |
| 7,072,136 B2 | 7/2006 | Pit et al. |

(Continued)

OTHER PUBLICATIONS

Ching F. Yong, Eddie Y. K. Ng, Wei D. Zhou, Wan K. Ng, "Design and Modeling of Femto Air Bearing Slider," Engineering, 2010, 2, 841-854,doi:10.4236/eng.2010.211107, Nov. 2010 (http://www.scirp.org/journal/eng).

(Continued)

*Primary Examiner* — Allen T Cao
(74) *Attorney, Agent, or Firm* — Jacobsen IP Law

(57) ABSTRACT

Disclosed herein are slider designs having improved trailing air flow dams, and data storage devices including such sliders. In some embodiments, a slider comprises a trailing edge and an air-bearing surface (ABS) comprising a trailing edge pad, and a trailing air flow dam coupled to the trailing edge pad, wherein, in an ABS view of the slider, the trailing air flow dam is recessed from and curves away from the trailing edge. In the ABS view, a shape of the trailing air flow dam may comprise two segments. The slider also has a leading edge and may at least one sub-ambient pressure cavity adjacent to the trailing air flow dam and disposed between the trailing air flow dam and the leading edge. A contact point of the trailing air flow dam may be at least 50 microns from a corner of the slider.

20 Claims, 6 Drawing Sheets

(56) References Cited

U.S. PATENT DOCUMENTS

| | | |
|---|---|---|
| 7,256,965 B2 | 8/2007 | Rao et al. |
| 7,542,223 B2 | 6/2009 | Hashimoto et al. |
| 7,855,854 B2 | 12/2010 | Hu et al. |
| 7,872,833 B2 | 1/2011 | Hu et al. |
| 8,089,729 B2 | 1/2012 | Huang |
| 8,169,744 B2 | 5/2012 | Dorius |
| 8,174,794 B2 | 5/2012 | Dorius |
| 8,289,653 B2 | 10/2012 | Huang |
| 8,810,968 B2 | 8/2014 | Rajasekharan et al. |
| 8,988,830 B1 | 3/2015 | Peng et al. |
| 9,886,976 B2 | 2/2018 | Huang |
| 2009/0141403 A1* | 6/2009 | Hu .................. G11B 5/6082 360/235.7 |
| 2011/0199704 A1* | 8/2011 | Huang ............... G11B 5/6005 360/97.12 |

OTHER PUBLICATIONS

Leonard Verano Gonzaga, Bo Liu, Shengkai Yu, Wei Hua, and Weidong Zhou, "Slider Design Optimization for Lube-Surfing Head-Disk Interface Scheme," IEEE Trans. on Magnetics, vol. 46, No. 6, pp. 1922-24, Jun. 2010.

* cited by examiner

AIR-BEARING SURFACE DESIGNS WITH A CURVED TRAILING AIR FLOW DAM

CROSS-REFERENCE TO RELATED APPLICATIONS

This application is a divisional of, and hereby incorporates by reference for all purposes the entirety of the contents of, co-pending U.S. application Ser. No. 16/369,710, filed Mar. 29, 2019 and entitled "AIR-BEARING SURFACE DESIGNS WITH A CURVED TRAILING AIR FLOW DAM".

BACKGROUND

Certain types of data storage devices, such as, for example, magnetic hard disk drives, include a ramp located near the outer circumference of a magnetic disk. The ramp provides a region into which a slider that carries the read/write transducer(s) is retracted when the disk is not being accessed.

After being loaded from the ramp to the magnetic disk, and while the slider is in the vicinity of the ramp, the flying posture of the slider can be unstable. For example, the slider can pitch and roll more in this region than it typically does when flying over other portions of the disk. Accordingly, there is a higher probability that the slider will contact the recording surface of the magnetic disk in this region of the disk, potentially causing damage to the recording surface. Thus, in the vicinity of the ramp, near the outer circumference of the magnetic disk, an area of the disk may be unused for recording due to the higher-than-typical potential for contact between the slider and the recording surface when the slider moves on and off the ramp.

Because the ramp and the unused area of the recording surface are near the outer circumference of the disk, a relatively large portion of the recording surface may be unused for recording. Consequently, there is an ongoing need to reduce the size of the area of the recording surface that is unused because of the relatively higher potential of the slider making contact with the recording surface in this region.

SUMMARY

This summary represents non-limiting embodiments of the disclosure.

Disclosed herein are slider designs that enable designers of data storage devices, such as hard disk drives, to set aside less of the recording surface as unused because of the potential for contact between the slider and the recording surface. Also disclosed are data storage devices comprising such sliders.

The disclosed sliders include a trailing air flow dam that is at least partially recessed from the trailing edge and from the inner- and/or outer-diameter edges of the slider, thereby shifting the points of the slider that are most likely to contact the recording surface away from the corners of the slider air-bearing surface (ABS). As a result, when the slider transitions onto or off of the ramp, if it does contact the recording surface, it is more likely to do so within a narrower part of the recording surface than a conventional slider. Assuming the unused area is an annulus extending inward from at or near the outer circumference of the disk, the distance between the outer and inner circles bounding the annulus can be reduced (i.e., the circumference of the inner circle can be larger) when the disclosed slider designs are used. Consequently, the area set aside as unused due to the likelihood of contact with the slider can be reduced. Stated another way, the new slider designs allow more of the recording surface to be used for data storage.

In some embodiments, a slider comprises a trailing edge, and an air-bearing surface (ABS) comprising a trailing edge pad and a trailing air flow dam coupled to the trailing edge pad. In some embodiments, in an ABS view of the slider, the trailing air flow dam is recessed from and curves away from the trailing edge. In some embodiments, the trailing edge pad comprises a read/write transducer.

In some embodiments, the slider further comprises a leading edge, and the ABS further comprises at least one sub-ambient pressure cavity adjacent to the trailing air flow dam and disposed between the trailing air flow dam and the leading edge. In some such embodiments, a depth of the at least one sub-ambient pressure cavity with respect to a surface of the trailing edge pad is between approximately 0.5 microns and approximately 2 microns. In some embodiments in which the ABS further comprises at least one sub-ambient pressure cavity, a surface of the at least one sub-ambient pressure cavity is substantially flat and/or substantially smooth.

In some embodiments, a contact point of the trailing air flow dam is at least 50 microns from a corner of the slider.

In some embodiments, the ABS further comprises a recessed surface disposed between the trailing air flow dam and the trailing edge, wherein, relative to a surface of the trailing edge pad, a depth of the recessed surface is between approximately 0.5 microns and approximately 5 microns.

In some embodiments, in the ABS view of the slider, the trailing air flow dam comprises at least two segments. In some embodiments in which the trailing air flow dam comprises at least two segments, at least one of the at least two segments is substantially linear. In some embodiments in which the trailing air flow dam comprises at least two segments, at least one of the at least two segments is at an acute angle from the trailing edge. In some embodiments in which the trailing air flow dam comprises at least two segments, a first segment of the at least two segments is at a first acute angle from the trailing edge, and a second segment of the at least two segments is at a second acute angle from the trailing edge, wherein the first and second acute angles are different.

In some embodiments, in the ABS view of the slider, the trailing air flow dam has an curved shape.

In some embodiments, a media-facing surface of the trailing air flow dam is substantially flat. In some embodiments, a media-facing surface of the trailing air flow dam is substantially smooth.

In some embodiments, at least a portion of a media-facing surface of the trailing air flow dam is recessed from a surface of the trailing edge pad. In some such embodiments, relative to a surface of the trailing edge pad, a depth of the at least a portion of the media-facing surface of the trailing air flow dam is between approximately 0.05 microns and approximately 0.25 microns.

In some embodiments, the slider further comprises at least one recessed surface disposed between the trailing air flow dam and the trailing edge. In some such embodiments, relative to a surface of the trailing edge pad, a depth of the at least one recessed surface is between approximately 0.5 microns and approximately 5 microns.

In some embodiments, the curve away from the trailing edge is monotonic.

BRIEF DESCRIPTION OF THE DRAWINGS

Objects, features, and advantages of the disclosure will be readily apparent from the following description of certain embodiments taken in conjunction with the accompanying drawings in which.

DETAILED DESCRIPTION

Disclosed herein are data storage device slider designs that increase the storage capacity of a data storage device, such as, for example, a magnetic disk drive, by reducing the area of the recording surface of a magnetic disk that is set aside and/or unused due to the potential for contact with a slider near the ramp, thereby increasing the area of the recording surface that is available to store data.

Figure 1:
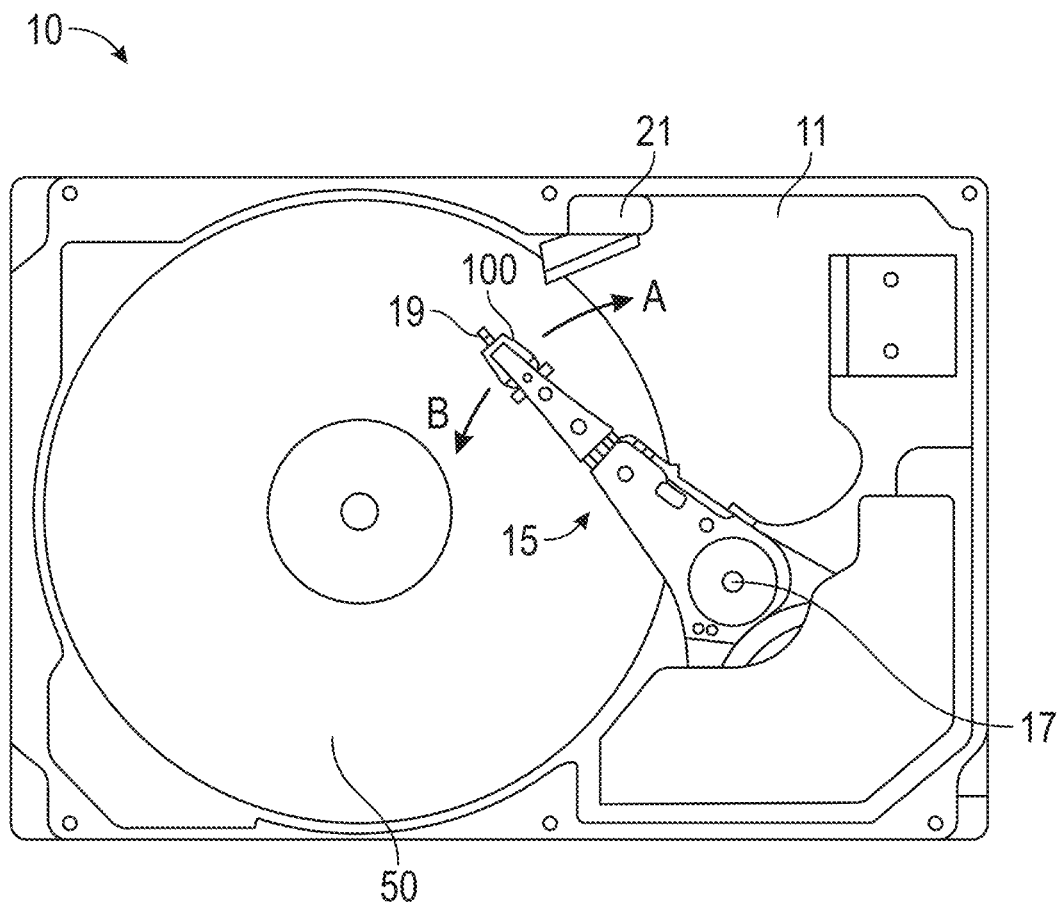
FIG. 1 is an exemplary plan view schematically illustrating a configuration of a data storage device in accordance with some embodiments.

FIG. 1 is a plan view schematically illustrating a configuration of an exemplary data storage device, namely a magnetic hard disk drive 10, in accordance with some embodiments. A magnetic disk 50 and a head support mechanism 15 are mounted on a base 11. A slider 100 is mounted on the tip side of the head support mechanism 15. The slider 100 pivotally moves about a pivot shaft 17 in a direction of an arrow A or B. The slider 100 includes a magnetic read/write transducer (also referred to as a head). A lift tab 19 is formed at the tip of the head support mechanism 15. When the disk 50 is not being accessed for reading or writing, the lift tab 19 is "parked" on a ramp 21. The ramp 21 has an inclined plane that extends upward from the surface of the disk 50. In the exemplary embodiment of FIG. 1, the ramp 21 extends out over the disk 50. In other embodiments, the ramp 21 may not extend out over the disk 50 due to, for example, lack of room.

To access the disk 50, the slider 100 is "loaded" from the ramp 21. The head support mechanism 15 rotates in the direction of the arrow B, and the lift tab 19 moves down the inclined plane of the ramp 21 and eventually leaves the ramp 21. When the disk access is complete, the slider 100 is "unloaded" onto the ramp 21. The head support mechanism 15 rotates in the direction of the arrow A, and the lift tab 19 makes contact with and slides up the inclined plane of the ramp 21 so that the slider 100 is withdrawn. The process of using the ramp 21 to move the slider 100 into position for recording or reading, and, when done, to withdraw the slider 100 from the magnetic disk 50 is called "loading/unloading" or simply "load/unload."

Whether moving in the direction of the arrow A or the arrow B, while the lift tab 19 is in contact with the ramp 21 in the exemplary disk drive 10 of FIG. 1, the airflow on the surface of the magnetic disk 50 provides a lifting force on an air bearing surface (ABS) of the slider 100. Because the slider 100 is under the influence of the airflow at the same time the lift tab 19 and ramp 21 are supporting the slider 100, the behavior of the slider 100 is generally unstable when the lift tab 19 is in contact with the ramp 21. In some circumstances, the slider 100 can make contact with the disk 50 while it is parked on the ramp 21. Accordingly, data typically is not written to or read from any portion of the disk 50 that resides under the ramp 21.

In addition, during the loading process, immediately after the lift tab 19 loses contact with the ramp 21, the behavior of the slider 100 is also unstable. Accordingly, when the lift tab 19 loses contact with the ramp 21, the slider 100 remains in a state in which it is more likely to touch the recording surface of the magnetic disk 50 than when it flies over the portions of the disk 50 in which it reads and writes data. Therefore, data typically is also not written to the area of the disk 50 near the end of the ramp 21.

An additional source of instability arises when the slider 100 flies near the edge of the disk 50. In this location, because of, for example, burnishing, debris, uneven air pressure, and/or suboptimal air speed, the flight characteristics of the slider 100 are not as stable as when the slider 100 flies further away from the edge of the disk 50. In extreme cases, the conditions near the edge of the disk 50 can cause the slider 100 to lose air pressure and become unstable, potentially striking the disk 50.

Because of the generally cuboid shape of prior-art sliders, as a result of the instabilities in the slider 100 flight characteristics under the above-mentioned circumstances, there is, with prior-art sliders, a relatively high probability that a corner of the slider 100 (which need not be a corner of a cuboid but is typically close to where such a corner would be) will make contact with the disk 50 while on the ramp 21 and/or during the load/unload process, which is a phenomenon sometimes referred to as "corner touchdown." Therefore, typically an annular region of the disk 50 near its outer edge, including near and under the ramp 21, is designated as a "non-data area" and is unused for data storage. Because the non-data area of the disk 50 is nearest to the outer circumference of the disk 50, the non-data area can correspond to a large and valuable region of the recording surface. Thus, it is desirable to reduce the size of the non-data area.

Disclosed herein are slider designs that reduce the likelihood of corner touchdown during loading and unloading, and while the slider is on the ramp 21 or near the outer edge of the disk 50. These designs shift inward the likely touchdown points from their typical locations at or near the corners of the trailing edge of the slider. By moving the more likely touchdown points inward, the outer portions of the slider, such as its corners, are less likely to make contact with the disk 50 during loading and unloading and while the slider is parked on the ramp 21. Stated another way, by moving the likely contact points, shifting them from the slider's corners and away from the inner and outer edges of the slider, the slider can roll more during the load/unload process and while on the ramp 21 without its outer extremities making contact with the disk 50. As a result, the size of the non-data area of the disk 50 can be reduced, thereby increasing the area available for the storage of data.

Figure 2:
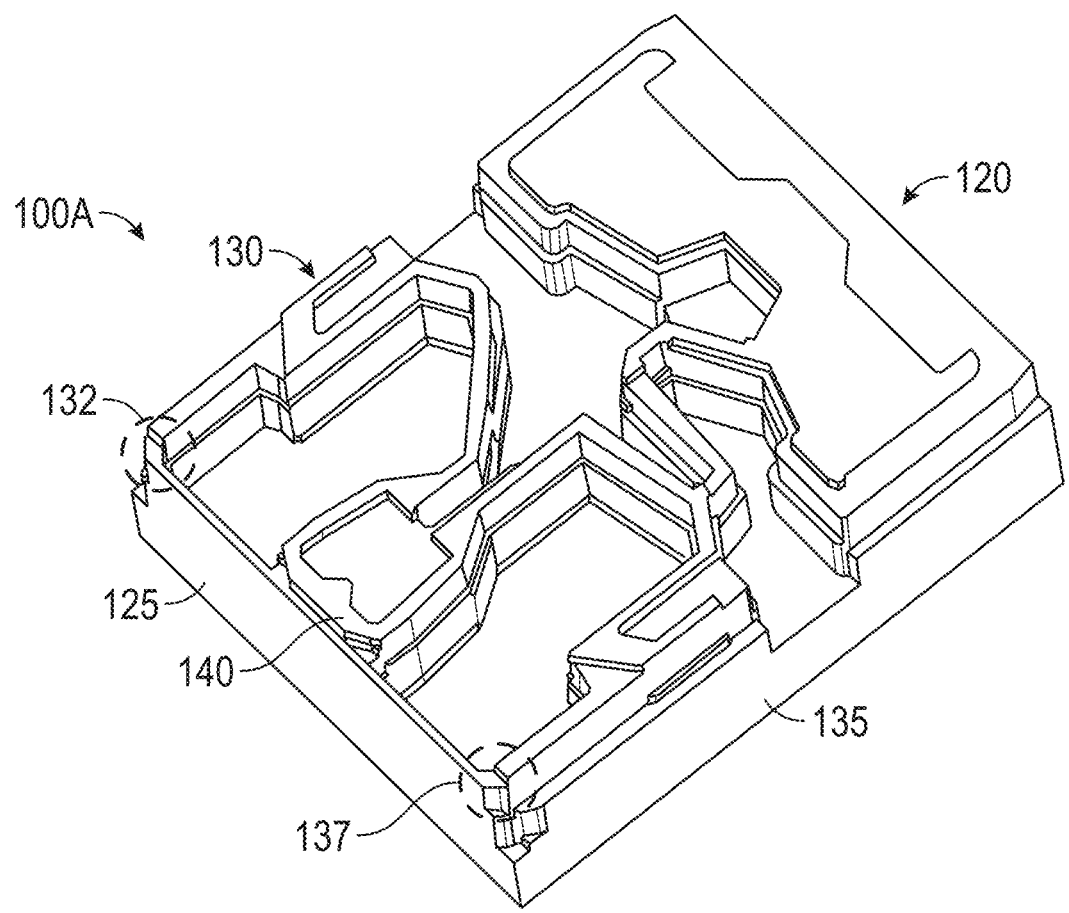
FIG. 2 illustrates a slider with a conventional trailing air flow dam.

FIG. 2 illustrates a slider 100A that does not include the curved trailing air flow dam disclosed herein. The slider 100A has a leading edge 120, a trailing edge 125, an outer-diameter edge 135 extending between the leading edge 120 and the trailing edge 125, and an inner-diameter edge 130 that also extends between the leading edge 120 and the trailing edge 125. The slider 100A has a trailing edge pad 140, which is where the read/write transducer resides. The slider 100A also has an inner corner 132 and an outer corner 137 near the trailing edge 125. Because of the pitch of the slider 100A when it flies (i.e., with the leading edge 120 further away from the recording surface than the trailing edge), the inner corner 132 and the outer corner 137 are the parts of the slider 100A most likely to strike the recording surface of the disk 50 during the load/unload process and immediately after loading. One objective of the disclosed embodiments is to change the location of the part of the slider that is most likely to strike the recording surface of the disk 50.

Figure 3:
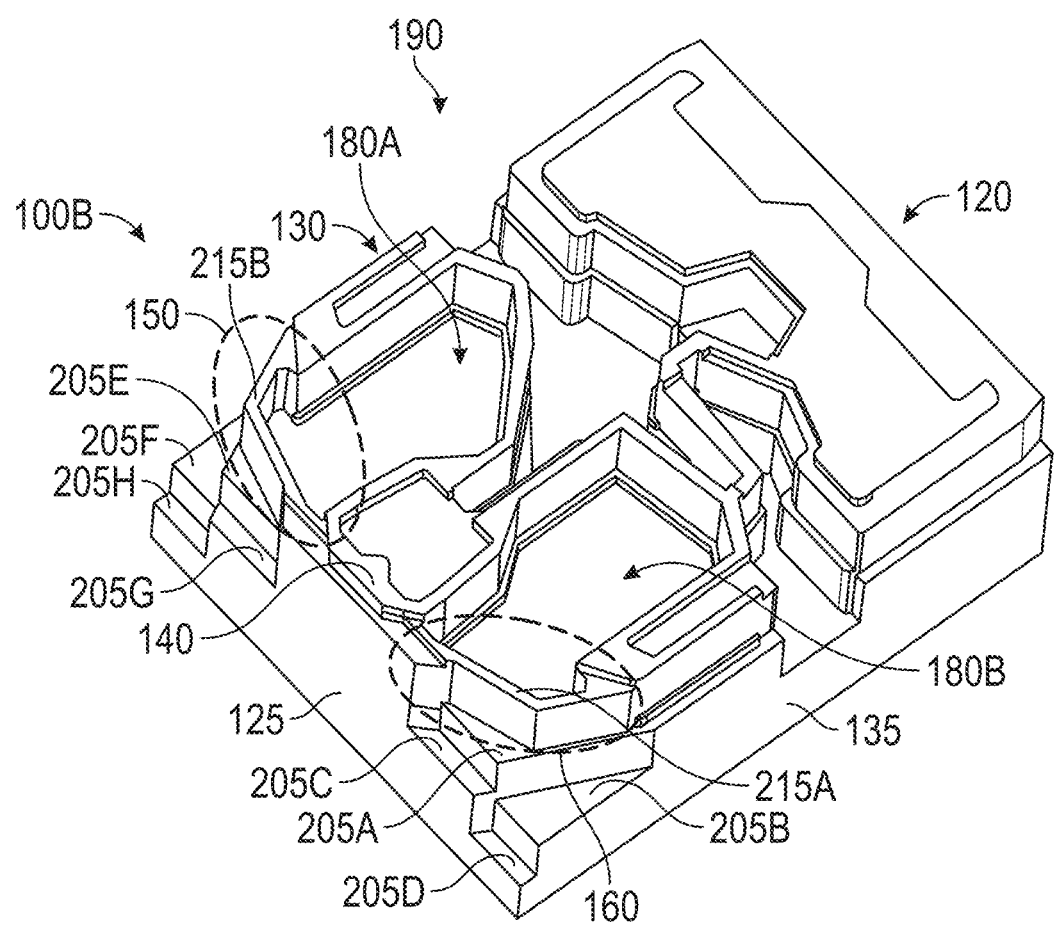
FIG. 3 illustrates a slider with a curved trailing air flow dam in accordance with some embodiments.

FIG. 3 illustrates a slider 100B with a curved trailing air flow dam in accordance with some embodiments. The following description of FIG. 3 refers to an inner-diameter trailing air flow dam 150 and an outer-diameter trailing air flow dam 160 as separate entities. It is to be appreciated that the inner- and outer-diameter trailing air flow dams 150, 160 can be considered to be two portions of a single trailing air flow dam coupled to the trailing edge pad 140.

Like the slider 100A of FIG. 2, the slider 100B has a leading edge 120, a trailing edge 125, an outer-diameter edge 135 extending between the leading edge 120 and the trailing edge 125, and an inner-diameter edge 130 that also extends between the leading edge 120 and the trailing edge 125. The slider 100B also has a trailing edge pad 140 with a read/write transducer. Unlike the slider 100A, the slider 100B includes an inner-diameter trailing air flow dam 150 and an outer-diameter trailing air flow dam 160. As FIG. 3 illustrates, both the inner-diameter trailing air flow dam 150 and the outer-diameter trailing air flow dam 160 are recessed from and curve away from the trailing edge 125.

In the embodiment of FIG. 3, the inner-diameter trailing air flow dam 150 has a media-facing surface 215B that is substantially flat and smooth. Likewise, the outer-diameter trailing air flow dam 160 has a media-facing surface 215A that is substantially flat and smooth. The media-facing surfaces 215A and 215B are referred to as "media-facing" because when the slider 100B is in operation, the surfaces 215A and 215B are substantially opposite the recording surface of the disk 50. In other embodiments, the media-facing surfaces 215A, 215B may be non-flat (e.g., sloped, curved, etc.) and/or non-smooth (e.g., with holes, protrusions, etc.). In the exemplary embodiment of FIG. 3, when the ABS 190 of the slider is oriented upward as shown in FIG. 3, the media-facing surfaces 215A and 215B are recessed from the surface of the trailing edge pad 140. In some embodiments, each of the media-facing surfaces 215A, 215B is at a depth of between approximately 0.05 microns and approximately 0.25 microns below the surface of the trailing edge pad 140 in the orientation of the slider 100B in which the ABS 190 is oriented upward. In other embodiments, the media-facing surfaces 215A, 215B are not recessed from the surface of the trailing edge pad 140.

The slider 100B includes a sub-ambient pressure cavity 180B that is disposed adjacent to and upstream of the outer-diameter trailing air flow dam 160, and a sub-ambient pressure cavity 180A that is disposed adjacent to and upstream of the inner-diameter trailing air flow dam 150. In other words, the ABS 190 of the exemplary slider 100B includes two sub-ambient pressure cavities 180A, 180B that are, respectively, between the inner-diameter trailing air flow dam 150 and the leading edge 120 and between the outer-diameter trailing air flow dam 160 and the leading edge 120.

As shown in FIG. 3, when the ABS 190 of the exemplary slider 100B is oriented upward, the surface of each of the sub-ambient pressure cavities 180A, 180B is recessed relative to the surface of the trailing edge pad 140. The amounts by which the surfaces of the sub-ambient pressure cavities 180A, 180B are recessed may be the same as or different from each other. In some embodiments, the depth of the surface of each of the sub-ambient pressure cavities 180A, 180B, relative to the surface of the trailing edge pad 140, is between approximately 0.5 microns and approximately 2 microns below the surface of the trailing edge pad. Moreover, the surfaces of the sub-ambient pressure cavities 180A, 180B may be flat and smooth (as shown in FIG. 3), or non-flat (e.g., sloped, curved, etc.) and/or not smooth (e.g., with holes, protrusions, etc.).

As shown in FIG. 3, the exemplary slider 100B has several recessed surfaces 205A, 205B, 205C, and 205D disposed between the outer-diameter trailing air flow dam 160, the outer-diameter edge 135, and the trailing edge 125, and it similarly has several recessed surfaces 205E, 205F, 205G, and 205H disposed between the inner-diameter trailing air flow dam 150, the inner-diameter edge 130, and the trailing edge 125. When the ABS 190 of the slider 100B is oriented upward as shown in FIG. 3, at least one of the recessed surfaces 205A, 205B, 205C, 205D, 205E, 205F, 205G, 205H is at a depth of between approximately 0.5 microns and approximately 5 microns below the surface of the trailing edge pad 140.

Figure 4A:
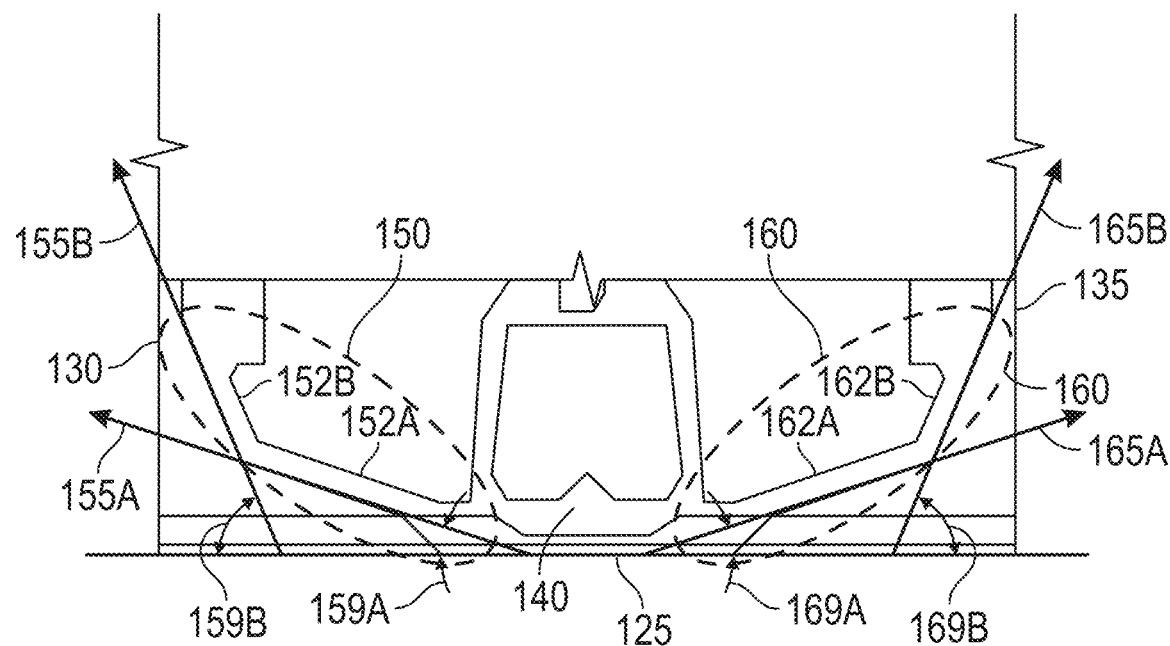
FIG. 4A is a closer view of the inner-diameter trailing air flow dam and the outer-diameter trailing air flow dam of FIG. 3.

FIG. 4A is a closer, ABS view of the inner-diameter trailing air flow dam 150 and the outer-diameter trailing air flow dam 160 of the exemplary slider 100B shown in FIG. 3. The inner-diameter trailing air flow dam 150 in the exemplary slider 100B has two portions (or segments), 152A and 152B. The portion 152A extends in a direction 155A from the trailing edge pad 140 toward the inner-diameter edge 130 at an angle 159A from the trailing edge 125 (i.e., the direction 155A is not parallel to the trailing edge 125). In the exemplary embodiment of FIG. 4A, the angle 159A is an acute angle. The portion 152B of the inner-diameter trailing air flow dam 150 extends in a direction 155B toward the inner-diameter edge 130 at an angle 159B from the trailing edge 125 (i.e., the direction 155B is also not parallel to the trailing edge 125). Like the angle 159A, the angle 159B is an acute angle. In the exemplary embodiment shown in FIG. 4A, the angle 159B is larger than the angle 159A, and the inner-diameter trailing air flow dam 150 curves away from the trailing edge 125.

Similarly, the outer-diameter trailing air flow dam 160 in the exemplary slider 100B has two portions (or segments), 162A and 162B. The portion 162A extends in a direction 165A from the trailing edge pad 140 toward the outer-diameter edge 135 at an angle 169A from the trailing edge 125 (i.e., the direction 165A is not parallel to the trailing edge 125). In the exemplary embodiment of FIG. 4A, the angle 169A is an acute angle. The portion 162B of the outer-diameter trailing air flow dam 160 extends in a direction 165B toward the outer-diameter edge 135 at an angle 169B from the trailing edge 125 (i.e., the direction 165B is also not parallel to the trailing edge 125). Like the angle 169A, the angle 169B is an acute angle, but, in the exemplary embodiment of FIG. 4A, the angle 169B is larger than the angle 169A. The outer-diameter trailing air flow dam 160 curves away from the trailing edge 125 (as does the inner-diameter trailing air flow dam 150).

As shown in FIG. 4A, at least a portion of both the inner-diameter trailing air flow dam 150 and the outer-diameter trailing air flow dam 160 is recessed from the trailing edge 125. For example, the entireties of the portions 152B and 162B are recessed from the trailing edge 125, and the portions 152A and 162A are also recessed from the trailing edge 125 because of where they contact the trailing edge pad 140 and because of their orientations in the directions 155A and 165A (at angles 159A and 169A from the trailing edge 125), respectively. Although FIG. 4A shows the entireties of the inner-diameter trailing air flow dam 150 and the outer-diameter trailing air flow dam 160 being recessed from the trailing edge 125, part of one or both of the inner-diameter trailing air flow dam 150 and the outer-diameter trailing air flow dam 160 may extend to the trailing edge 125. As just one example, the most rearward portions of the inner-diameter trailing air flow dam 150 and the outer-diameter trailing air flow dam 160 may extend to the trailing edge 125 such as, for example, where they are nearest (e.g., coupled to) the trailing edge pad 140. Even if not all of the inner-diameter trailing air flow dam 150 and the outer-diameter trailing air flow dam 160 is recessed from the trailing edge 125, at least some portion of the inner-diameter trailing air flow dam 150 and the outer-diameter trailing air flow dam 160 is recessed from the trailing edge 125 such that the inner-diameter trailing air flow dam 150 and the outer-diameter trailing air flow dam 160 curve away from the trailing edge 125.

Figure 4B:
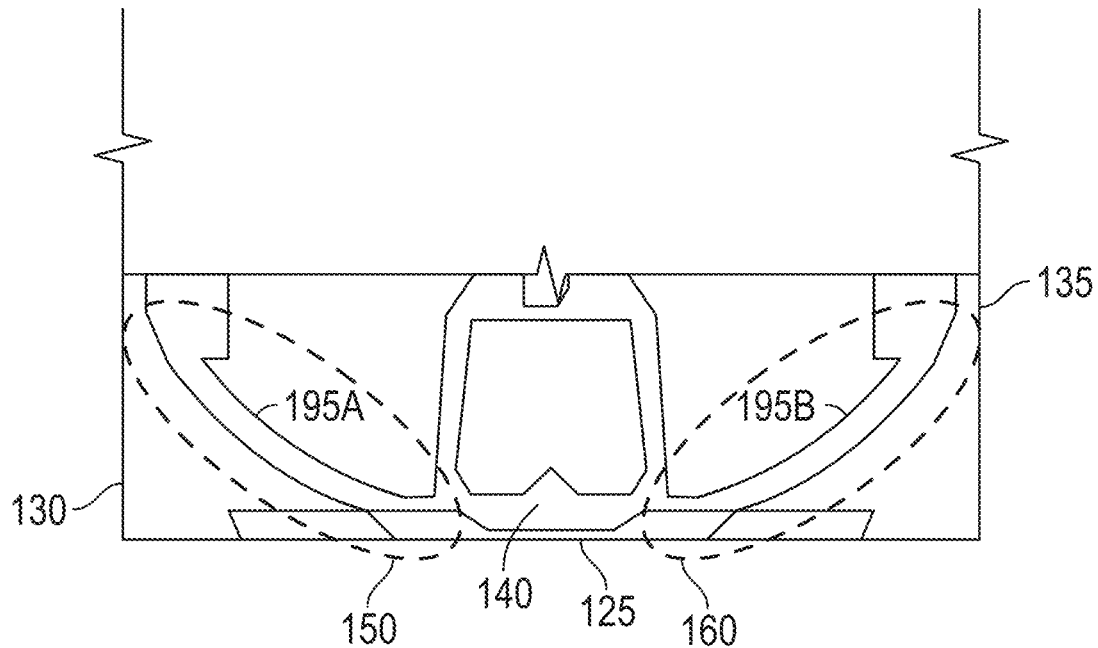
FIG. 4B is a view of an inner-diameter trailing air flow dam and an outer-diameter trailing air flow dam in accordance with some embodiments.

FIG. 4B is an ABS view of another inner-diameter trailing air flow dam 150 and another outer-diameter trailing air flow dam 160 in accordance with some embodiments. In the exemplary embodiment shown in FIG. 4B, the inner-diameter trailing air flow dam 150 and the outer-diameter trailing air flow dam 160 have the shape of an arc. Specifically, the inner-diameter trailing air flow dam 150 comprises an arc 195A and the outer-diameter trailing air flow dam 160 comprises an arc 195B.

FIGS. 4A and 4B show two exemplary shapes for the inner-diameter trailing air flow dam 150 and the outer-diameter trailing air flow dam 160. It is to be understood that the illustrated shapes are merely examples and are not intended to be limiting. For example, the inner-diameter trailing air flow dam 150 and/or the outer-diameter trailing air flow dam 160 may have more or fewer segments 152, 162 than shown in FIG. 4A. As a specific example, the inner-diameter trailing air flow dam 150 and/or the outer-diameter trailing air flow dam 160 may have as few as a single segment 152, 162 that extends at a single angle 159, 169 from the trailing edge 125. (In this case, curving away from the trailing edge 125 reduces to simply extending away from the trailing edge 125 at a single angle.) As another example, the inner-diameter trailing air flow dam 150 and/or the outer-diameter trailing air flow dam 160 may have three or more segments 152, 162. As another example, the inner-diameter trailing air flow dam 150 and/or the outer-diameter trailing air flow dam 160 can have a more complicated curvature than shown in FIG. 4B, such as by including multiple curved portions, or a mix of curved and non-curved portions. As another example, each of the inner-diameter trailing air flow dam 150 and the outer-diameter trailing air flow dam 160 may have, in an ABS view, a smoothly curved shape extending away from the trailing edge 125. In general, the inner-diameter trailing air flow dam 150 and the outer-diameter trailing air flow dam 160 can have any shape and configuration that results in them curving away from the trailing edge 125 as they extend toward, respectively, the inner-diameter edge 130 and the outer-diameter edge 135. Specifically, any shape that can be realized in a photolithographic process (e.g., down to dimensions of a few microns) can be used. Furthermore, it is to be understood that the inner-diameter trailing air flow dam 150 and the outer-diameter trailing air flow dam 160 need not curve monotonically away from the trailing edge 125. It is sufficient that at least a portion of each of the inner-diameter trailing air flow dam 150 and the outer-diameter trailing air flow dam 160 curves or extends away from the trailing edge 125 as described herein.

Figure 5:
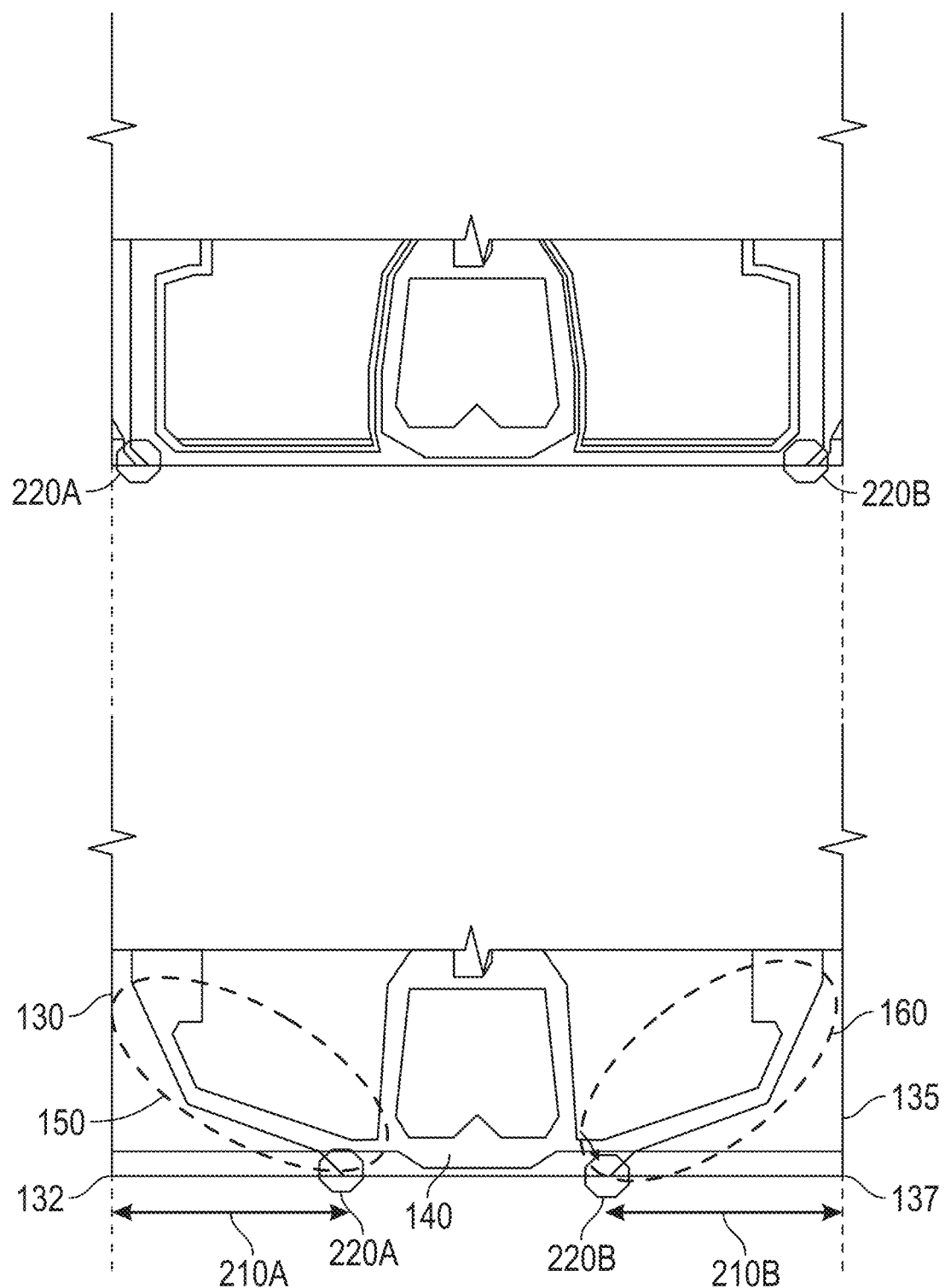
FIG. 5 illustrates the locations of the likely contact points in sliders without and with the trailing air flow dams disclosed herein.

FIG. 5 illustrates the locations of the likely contact points in sliders without (upper) and with (lower) the inner-diameter trailing air flow dam 150 and the outer-diameter trailing air flow dam 160. The upper portion of FIG. 5 is a close-up view of the trailing-edge portion of a slider, such as, for example, the slider 100A of FIG. 2, that does not include the inner-diameter trailing air flow dam 150 and the outer-diameter trailing air flow dam 160. As shown, the likely contact points 220A and 220B, encircled by octagons, are near the corners of the slider. The lower portion of FIG. 5 is the portion of the slider 100B shown in FIG. 4A, illustrating the inner-diameter trailing air flow dam 150 and the outer-diameter trailing air flow dam 160 described in the context of FIG. 4A. As shown in FIG. 5, the effect of the designs of the inner-diameter trailing air flow dam 150 and the outer-diameter trailing air flow dam 160 is to shift the likely contact points 220A and 220B toward the trailing edge pad 140, i.e., closer to the middle of the trailing edge 124. As a result of the use of the inner-diameter trailing air flow dam 150 and the outer-diameter trailing air flow dam 160, the contact point 220A is a distance 210A from the inner corner 132 of the sider 100B, and the contact point 220B is a distance 210B from the outer corner 137. The distances 210A, 210B may be selected to meet various design constraints and considerations, including, for example, a desired or maximum width of an annulus defining the non-data area of the disk 50. In some embodiments, at least one of the distances 210A, 210B is greater than approximately 50 microns. In some embodiments, at least one of the distances 210A, 210B is at least 200 microns.

Figure 6:
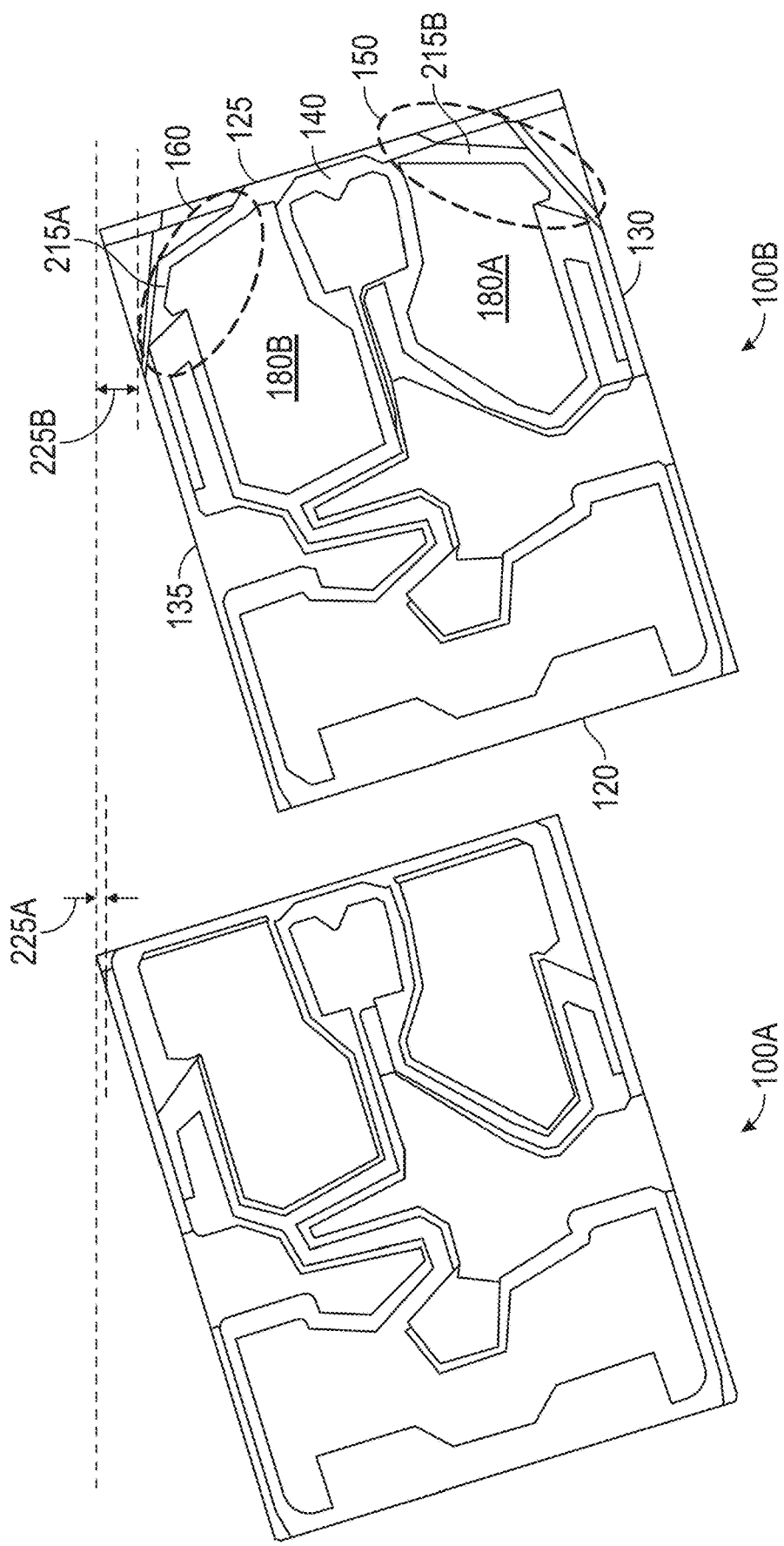
FIG. 6 illustrates the improvement in the outer-diameter glide margin that results in accordance with some embodiments.

FIG. 6 illustrates the improvement in the outer-diameter glide margin that results in accordance with some embodiments having the inner-diameter trailing air flow dam 150 and the outer-diameter trailing air flow dam 160. The left-hand side of FIG. 6 shows a slider, such as, for example, the slider 100A shown in FIG. 2, that does not include the curved inner-diameter trailing air flow dam 150 and the curved outer-diameter trailing air flow dam 160. As shown, in flight the slider 100A has an outer-diameter glide margin 225A. In comparison, the right-hand side FIG. 6 shows the slider 100B and the curved inner-diameter trailing air flow dam 150 and the curved outer-diameter trailing air flow dam 160. As shown, the result of the inner-diameter trailing air flow dam 150 and the outer-diameter trailing air flow dam 160 being recessed from and curving away from the trailing edge 125, the outer-diameter glide margin 225B is significantly larger than for the slider 100A.

In the foregoing description and in the accompanying drawings, specific terminology has been set forth to provide a thorough understanding of the disclosed embodiments. In some instances, the terminology or drawings may imply specific details that are not required to practice the invention.

To avoid obscuring the present disclosure unnecessarily, well-known components (e.g., of a disk drive) are shown in block diagram form and/or are not discussed in detail or, in some cases, at all.

Unless otherwise specifically defined herein, all terms are to be given their broadest possible interpretation, including meanings implied from the specification and drawings and meanings understood by those skilled in the art and/or as defined in dictionaries, treatises, etc. As set forth explicitly herein, some terms may not comport with their ordinary or customary meanings.

As used in the specification and the appended claims, the singular forms "a," "an" and "the" do not exclude plural referents unless otherwise specified. The word "or" is to be interpreted as inclusive unless otherwise specified. Thus, the phrase "A or B" is to be interpreted as meaning all of the following: "both A and B," "A but not B," and "B but not A." Any use of "and/or" herein does not mean that the word "or" alone connotes exclusivity.

As used in the specification and the appended claims, phrases of the form "at least one of A, B, and C," "at least one of A, B, or C," "one or more of A, B, or C," and "one or more of A, B, and C" are interchangeable, and each encompasses all of the following meanings: "A only," "B only," "C only," "A and B but not C," "A and C but not B," "B and C but not A," and "all of A, B, and C."

To the extent that the terms "include(s)," "having," "has," "with," and variants thereof are used in the detailed description or the claims, such terms are intended to be inclusive in a manner similar to the term "comprising," i.e., meaning "including but not limited to." The terms "exemplary" and "embodiment" are used to express examples, not preferences or requirements.

The terms "over," "under," "between," and "on" are used herein refer to a relative position of one feature with respect to other features. For example, one feature disposed "over" or "under" another feature may be directly in contact with the other feature or may have intervening material. Moreover, one feature disposed "between" two features may be directly in contact with the two features or may have one or more intervening features or materials. In contrast, a first feature "on" a second feature is in contact with that second feature.

The drawings are not necessarily to scale, and the dimensions, shapes, and sizes of the features may differ substantially from how they are depicted in the drawings.

Although specific embodiments have been disclosed, it will be evident that various modifications and changes may be made thereto without departing from the broader spirit and scope of the disclosure. For example, features or aspects of any of the embodiments may be applied, at least where practicable, in combination with any other of the embodiments or in place of counterpart features or aspects thereof. Accordingly, the specification and drawings are to be regarded in an illustrative rather than a restrictive sense.

What is claimed is:

1. A slider, comprising:
   a trailing edge; and
   an air-bearing surface (ABS) comprising:
      a trailing edge pad, and
      a trailing air flow dam coupled to the trailing edge pad, wherein, in an ABS view of the slider, (a) the trailing air flow dam is recessed from and curves away from the trailing edge, and (b) the trailing air flow dam comprises at least two segments, wherein a first segment of the at least two segments is at a first acute angle from the trailing edge, and a second segment of the at least two segments is at a second acute angle from the trailing edge.

2. The slider recited in claim 1, further comprising a leading edge, and wherein the ABS further comprises at least one sub-ambient pressure cavity adjacent to the trailing air flow dam and disposed between the trailing air flow dam and the leading edge.

3. The slider recited in claim 2, wherein a depth of the at least one sub-ambient pressure cavity relative to a surface of the trailing edge pad is between approximately 0.5 microns and approximately 2 microns.

4. The slider recited in claim 2, wherein a surface of the at least one sub-ambient pressure cavity is (a) substantially flat, (b) substantially smooth, or (c) both substantially flat and substantially smooth.

5. The slider recited in claim 2, wherein the ABS further comprises a recessed surface disposed between the trailing air flow dam and the trailing edge, wherein, relative to a surface of the trailing edge pad, a depth of the recessed surface is between approximately 0.5 microns and approximately 5 microns.

6. The slider recited in claim 1, wherein at least one of the at least two segments is substantially linear.

7. The slider recited in claim 1, wherein the first and second acute angles are different.

8. The slider recited in claim 1, wherein the curve away from the trailing edge is monotonic.

9. A data storage device comprising the slider recited in claim 1.

10. A slider, comprising:
    a trailing edge; and
    an air-bearing surface (ABS) comprising:
       a trailing edge pad, and
       a trailing air flow dam coupled to the trailing edge pad, wherein, in an ABS view of the slider, the trailing air flow dam is recessed from and curves away from the trailing edge, and
       wherein a contact point of the trailing air flow dam is at least 50 microns from a trailing corner of the slider.

11. The slider recited in claim 10, wherein, in the ABS view of the slider, the trailing air flow dam comprises at least two segments.

12. The slider recited in claim 11, wherein at least one of the at least two segments is at an acute angle from the trailing edge.

13. The slider recited in claim 10, wherein, in the ABS view of the slider, at least a portion of the trailing air flow dam has an arced shape.

14. The slider recited in claim 10, wherein the trailing edge pad comprises a read/write transducer.

15. The slider recited in claim 10, wherein a media-facing surface of the trailing air flow dam is substantially flat.

16. The slider recited in claim 10, wherein a media-facing surface of the trailing air flow dam is substantially smooth.

17. The slider recited in claim 10, wherein at least a portion of a media-facing surface of the trailing air flow dam is recessed from a surface of the trailing edge pad.

18. The slider recited in claim 17, wherein, relative to a surface of the trailing edge pad, a depth of the at least a portion of the media-facing surface of the trailing air flow dam is between approximately 0.05 microns and approximately 0.25 microns.

19. The slider recited in claim 10, further comprising at least one recessed surface disposed between the trailing air flow dam and the trailing edge.

20. The slider recited in claim 19, wherein, relative to a surface of the trailing edge pad, a depth of the at least one recessed surface is between approximately 0.5 microns and approximately 5 microns.

* * * * *